United States Patent [19]
Escher

[11] 3,812,672
[45] May 28, 1974

[54] SUPERCHARGED EJECTOR RAMJET AIRCRAFT ENGINE

[75] Inventor: William J. D. Escher, St. Johns, Mich.

[73] Assignee: CCI Aerospace Corporation, Van Nuys, Calif.

[22] Filed: Feb. 10, 1972

[21] Appl. No.: 225,255

[52] U.S. Cl............... 60/244, 60/246, 60/257, 60/261, 60/269, 60/270
[51] Int. Cl. .................... F02k 3/04, F02k 3/08
[58] Field of Search ............ 60/226, 225, 224, 262, 60/261, 244, 245, 269, 257, 246, 270

[56] References Cited
UNITED STATES PATENTS

| | | | |
|---|---|---|---|
| 2,937,491 | 5/1960 | Howell | 60/246 |
| 2,986,003 | 5/1961 | Buckingham | 60/244 |
| 3,111,005 | 11/1963 | Howell | 60/246 |
| 3,279,192 | 10/1966 | Hull | 60/269 |
| 3,395,539 | 8/1968 | Gozlan | 60/244 |
| 3,514,956 | 6/1970 | Bray | 60/270 |

*Primary Examiner*—Douglas Hart
*Attorney, Agent, or Firm*—Robert E. Geauque

[57] ABSTRACT

An aircraft engine which employs the use of a high bypass ratio fan and an ejector in combination with a ramjet, the fan being driven by a gas generator associated with the engine, the ejector formed of multiple jet nozzles to supply a monopropellent fluid forward of the combustion chamber of the engine.

9 Claims, 8 Drawing Figures

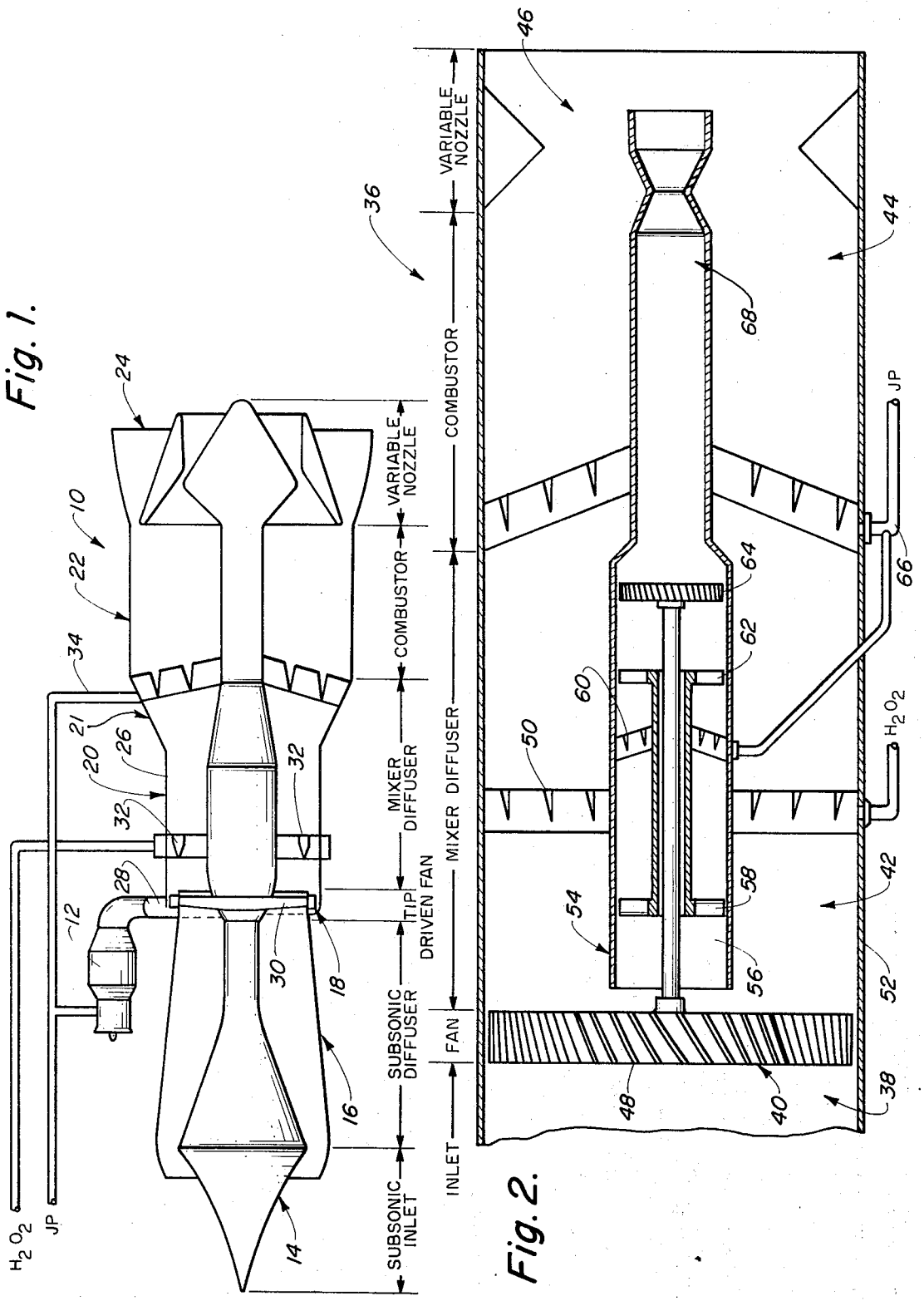

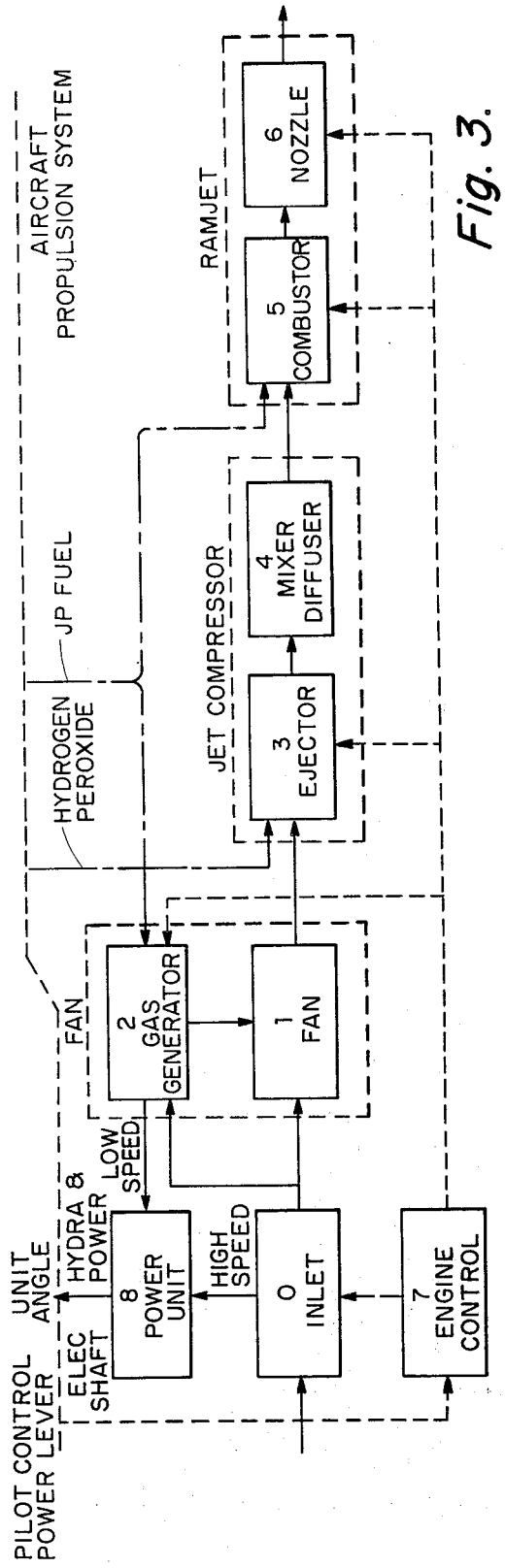
Fig. 3.
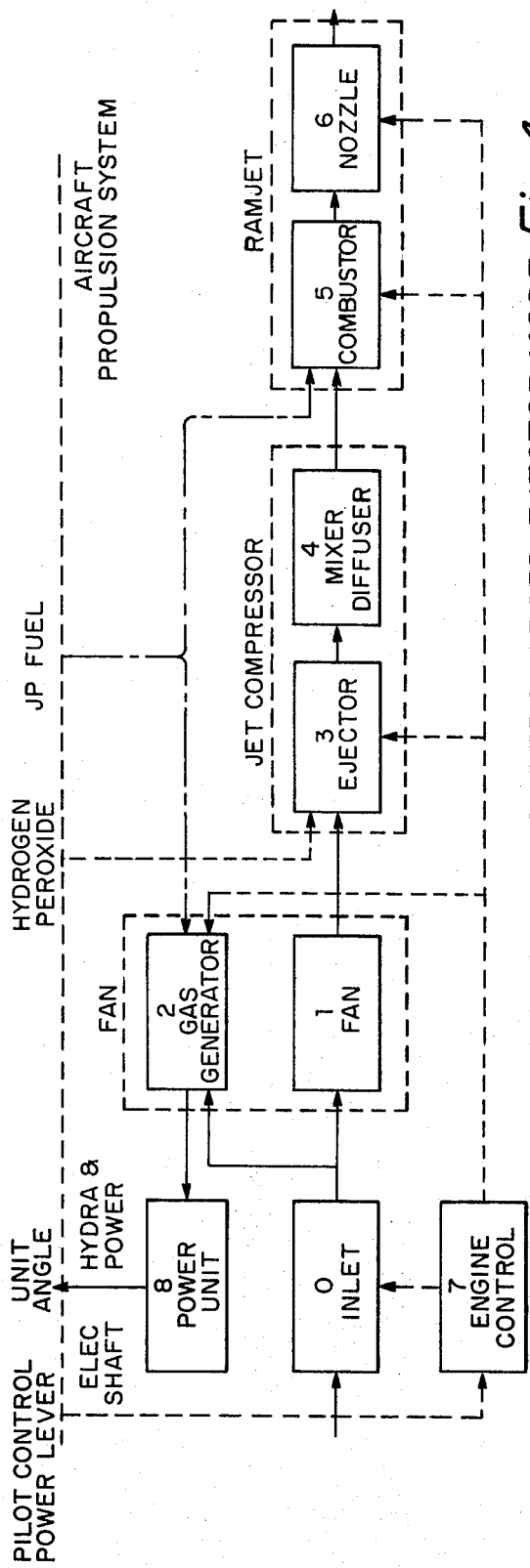
SUPERCHARGED EJECTOR MODE Fig. 4.

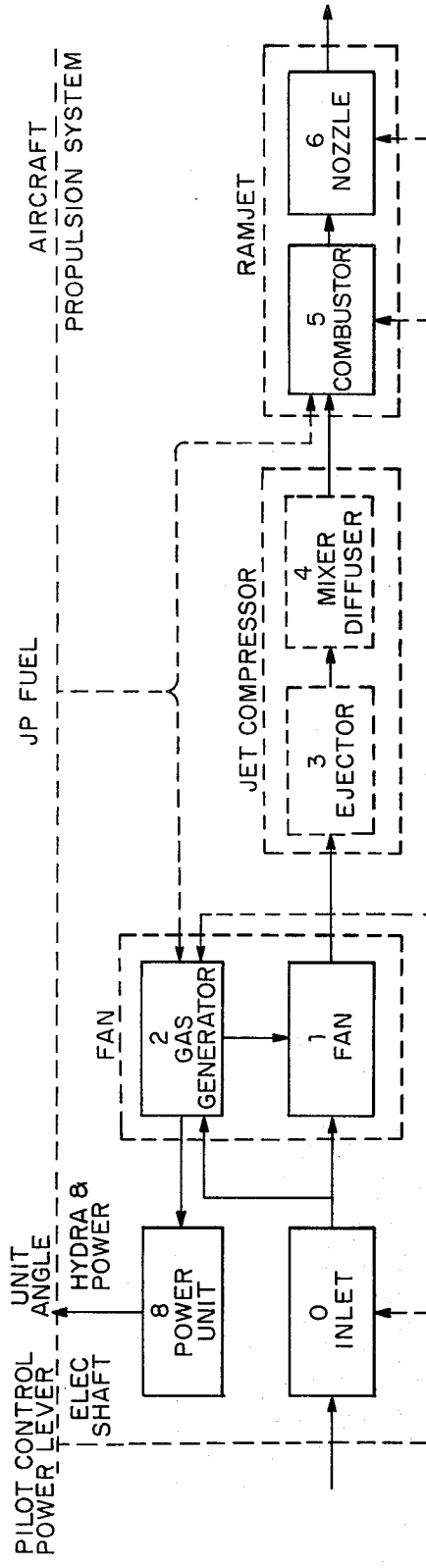
FAN RAMJET MODE Fig. 5.
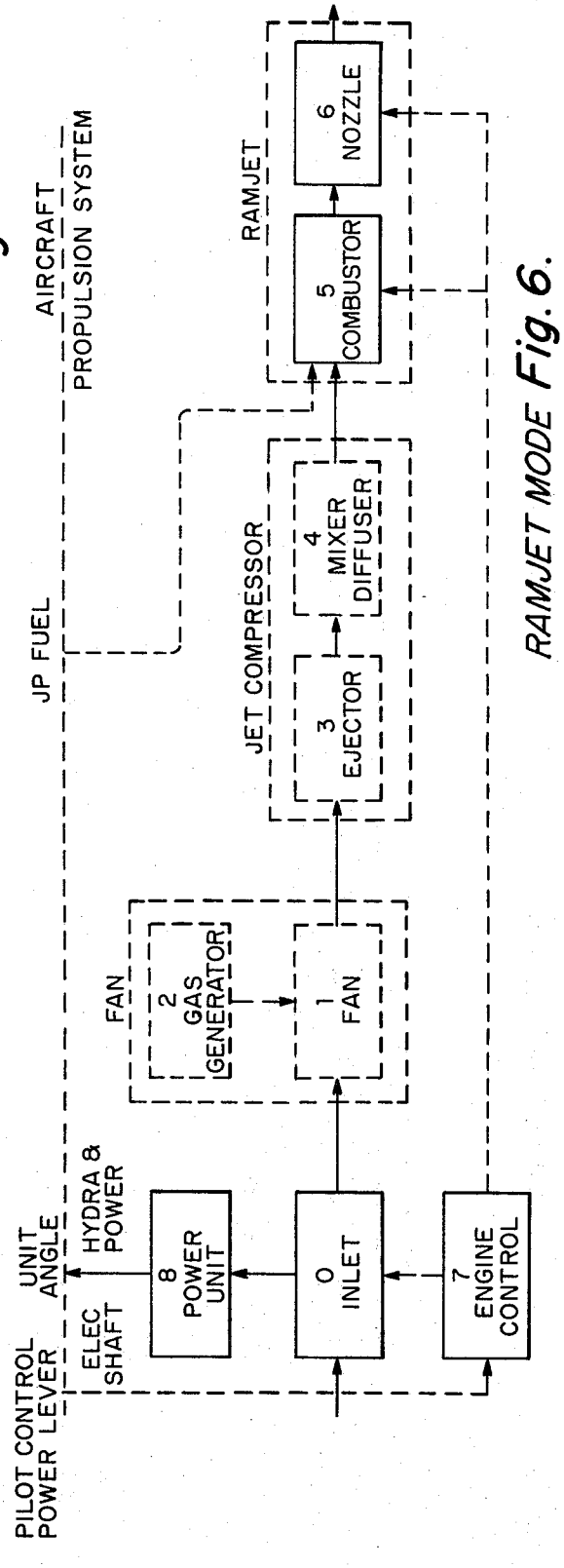
RAMJET MODE Fig. 6.

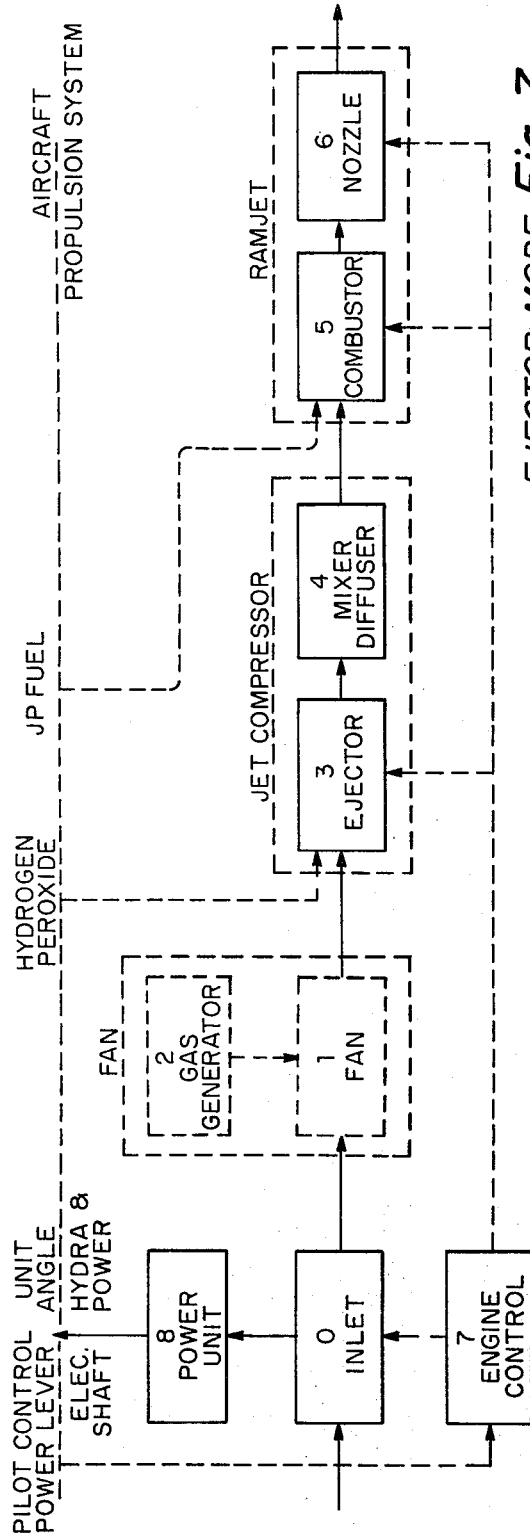
EJECTOR MODE Fig. 7.
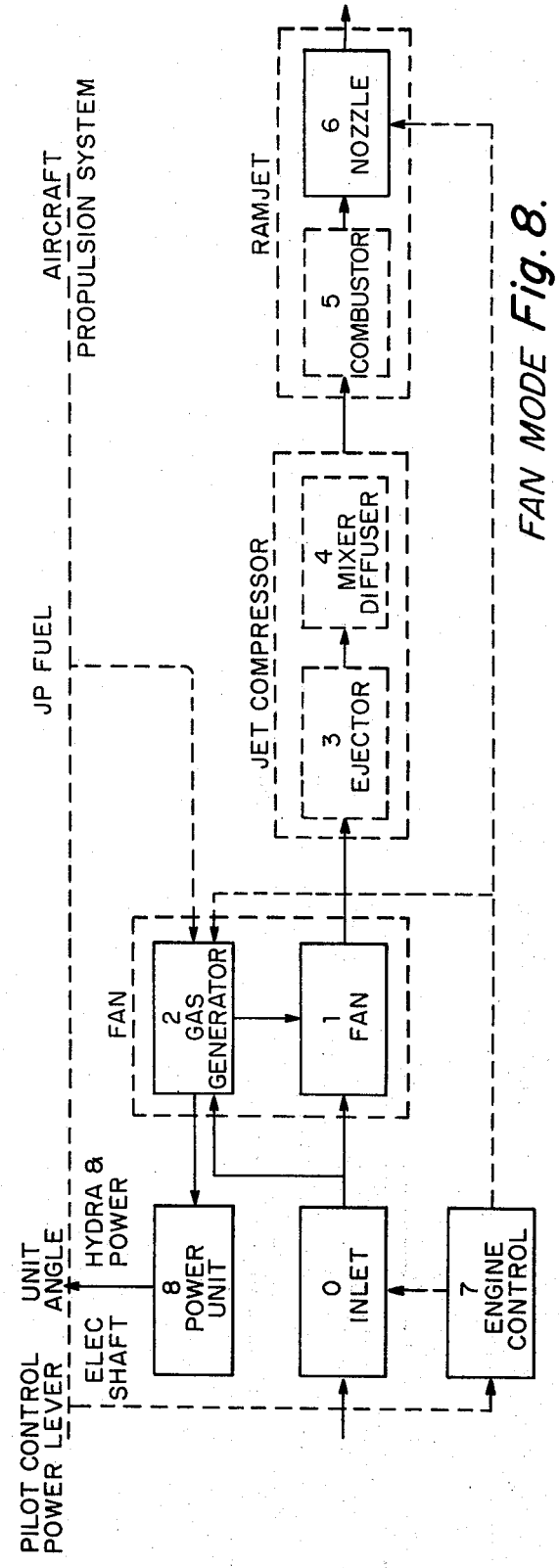
FAN MODE Fig. 8.

SUPERCHARGED EJECTOR RAMJET AIRCRAFT ENGINE

BACKGROUND OF THE INVENTION

The present invention relates generally to improvements in high-performance aircraft propulsion systems. Specifically the invention comprises a new engine configuration capable of providing economic and flexible performance across a significantly wider flight regime than heretofore accomplished. More specifically, the invention is capable of efficient subsonic cruise and loiter, low fuel consumption supersonic operation to speeds considerably in excess of current operational turbojet and turbofan engines and instantaneous high demand-thrust for combat maneuvering, extreme rates of climb, and ultra-short field takeoff.

It is generally recognized that various individually known aircraft engines are each best suited to a relatively narrow range of flying conditions, usually delineated in terms of flight speed and altitude. For instance, high bypass ratio turbofan engines are well matched to high altitude subsonic flight, whereas ramjets are excellent for high supersonic and hypersonic flight Mach number operation. Additionally, particularly for military aircraft, there is frequently the need to provide momentary high-thrust for rapid acceleration or to counter large amounts of drag as induced in combat maneuvering. Such demand-thrust capability is needed for achieving high rates of climb or to execute short field takeoff with a heavily loaded aircraft.

To a certain extent this thrust augmentation can be provided by adding an after burner unit to a turbojet or turbofan engine as in current practice. However, if very large amounts of augmentation are required, the installation of a rocket engine, usually a liquid propellant type, may be indicated as demonstrated in a number of extant aircraft applications.

Thus, by means of installing within the aircraft a plurality of separate types of engines, for example, a turbofan (with or without afterburning), a ramjet and a rocket, a much wider range of flight speeds and altitudes can be achieved as compared to that achievable with a single conventional engine installation. Additionally, the provision of a much more extensive range of on-demand thrust settings is achieved by means of said multiple type propulsion installations, particularly if a rocket is included as one element. The above described technical approach, namely, the use of said plurality of engine types, can be nominally referred to as a combination propulsion system, signifying the combining together of existing, separate engines — in themselves essentially unmodified — to satisfy more extensive aircraft propulsion requirements than can be met with a single conventional engine.

However, said combination propulsion systems usually incur significant weight, volume and cost penalties which detract from their overall attractiveness as compared to a single conventional engine installation. Furthermore, from the standpoints of pilot operation and aircraft servicing and maintenance, the combination propulsion system approach tends to be attended by an undesirable increase in complexity. Still further disadvantages are imposed in that, when a single one of the propulsive unit types is operated alone, as would offer best efficiency for a given flight regime, the remaining nonoperating unit types may directly or indirectly result in penalties to the makeup or operation of the aircraft. For example, when flying subsonically on turbofan-power, the separate nonoperating ramjet — needed for supersonic capability — may produce a large amount of aerodynamic drag. This will raise fuel consumption thus compromising the otherwise high efficiency of the turbofan. Additionally, because of the need to produce additional thrust to counter the ramjet-induced drag, a larger turbofan may be required than otherwise the case, with an attendant penalty to the aircraft in weight, volume and cost.

What is therefore desirable, and is achieved in the instant invention, is to acquire the described wide-range operating capability of the combination propulsion system, including high thrust operation on pilot demand, without the attendant disadvantageous features of said combination system. It is further desired that such an improved propulsion system have features generally similar to the aircraft engines of current practice, such as pilot operation with a single throttle. Furthermore, the servicing and maintenance of an aircraft equipped with said improved propulsion system should not be unduly complex or extensive in terms of equipment, supplies and personnel procedures. Still furthermore, in the acquisition of said improved propulsion systems only reasonable demands should be made on the existing state of technology. Extensive advancements in the underlying propulsion engineering art supportive of initial versions of said improved aircraft propulsion systems would require a significant monetary commitment and a commensurate number of years of predevelopment effort before a flight system could be demonstrated.

In summary, it is desired that an innovative aircraft engine concept providing high performance and outstanding operating economy and flexibility over a wider flight regime than heretofore achieved be accomplished. Initial versions of said improved engine should be based on the present data of the art.

SUMMARY OF THE INVENTION

Briefly, in accordance with this invention which is an improved aircraft engine, there is provided a basic aerodynamic duct or housing encompassing the engine's constituent subsystems. Ahead of the engine duct, in the sense of airflow direction, a wide speed range air inlet is to be installed; said air inlet is not embraced within the invention since it can be of a type well known to current practice. Within the duct are serially conjoined a fan and drive means, an ejector capable of providing high velocity gaseous flow, a constant area mixer section, a diffuser section which provides an enlarged area transition from the exit of the mixer to the combustor, a ramjet combustor, and an exhaust nozzle. These above named subsystems are mechanically integrated to provide a minimum weight and volume system, and are centrally operated by a single controller responsive to aircraft flight conditions and the signaled dictates of the crew. The instant invention is thus a composite propulsion system as contrasted to the aforementioned combination propulsion system in that it comprises a single, physically and functionally integrated device.

Said composite engine can achieve the desired wide-range performance objectives previously discussed, providing economical and flexible performance over a much greater flight regime than current practice devices. In essence, the goals of projected combination propulsion systems, or alternatively proposed composite engines such as the turboramjet and turbofanramjet, can be equalled or exceeded by the invention which will be found to be superior in terms of weight, volume and cost. Also, the instant composite engine will be more readily and economically developed than these above-mentioned alternatives by virtue of its uniquely integrated arrangement of constituent subsystems, each of which can be seen to be, as will become clear in the description to follow, a self-sufficient propulsive device out of current practice. The essence of the instant invention is the unique physical and functional integration of specially selected constituent subsystems. Therefore, strictly speaking, the invention contemplates the use of existing engineering practice in that it incorporates known propulsive equipment types such as turbofans and ramjets as constituent subsystems. Accordingly, the invention will require essentially no predevelopment and can thus be acquired directly through a normal development effort.

The invention's constituent subsystems are innovatively combined so that each may operate alone with little or no interference from the others, or several subsystems can be operated in concert cooperatively to optimally match the engine's thermodynamic operating cycle with the instantaneous aircraft flight conditions and thrust demand. As a result of this feature, termed multimode operation and to be described subsequently in detail, maximum fuel economy and thrust responsiveness is basic to this invention.

Similarly, by virtue of variable usage of the invention's constituent component parts, such as, for example, the ramjet combustor serving as an afterburner for the turbofan at subsonic flight speeds, two additional technical advantages accrue to the instant invention. One of these is minimization of engine weight and size. The second is virtual elimination of any interference effects ascribed to non-operating portions of the engine.

Notably the invention provides the above described technical and development advantages over alternative schemes in one composite engine type representing a logical extension of present practice wherein only one type of engine is installed.

In summary, the instant invention is a composite, multimode propulsion system which physically and functionally integrates subsystems fundamentally available from current practice. The engine is an optimal synthesis in that it is capable of providing a wider range, more flexible level of performance at minimum cost in both development and operation than presently achievable. The detailed particulars of the invention will be more easily understood as the description proceeds in development in the remaining portions of this specification.

BRIEF DESCRIPTION OF THE DRAWINGS

FIG. 1 is a diagrammatic view of the engine of this invention employing an externally located gas turbine fan drive means;

FIG. 2 is a diagrammatic cross-sectional view of the engine similar to FIG. 1 but showing the fan driven by a gas generator fan drive means located internal to the engine of this invention;

FIG. 3 is an overall functional block diagram delineating the major subsystems and their nominal interaction as well as the functional interfacing of the engine with an aircraft and crew;

FIG. 4, essentially identical to FIG. 3, is the block diagram of this engine when in the Supercharged Ejector mode;

FIG. 5 is a block diagram of this engine when in the Fan Ramjet mode;

FIG. 6 is a block diagram of this engine when in the Ramjet mode;

FIG. 7 is a block diagram of this engine when in the Ejector mode; and

FIG. 8 is a block diagram of this engine when in the Fan mode of operation.

DETAILED DESCRIPTION OF THE SHOWN EMBODIMENT

Referring to the drawings, there is shown in FIG. 1 a first embodiment 10 of the engine of this invention which employs the use of an externally located gas generator 12 fan drive means. The embodiment 10 of the engine of this invention includes an air induction system (inlet) 14, a subsonic diffuser 16, a tip-turbine driven fan assembly 18, a constant area mixer diffuser 20, a diffuser 21 a ramjet combustion chamber 22 and a variable geometry exit nozzle 24. The inlet 14 is so designed as to provide air to the engine housing 26 with minimum total pressure loss and flow distortion at the required velocity and total pressure, and in the quantities required by the engine. Because of the wide flight Mach number range over which the engine 10 of this invention is to operate, the inlet may require variable geometry features to effectively match the air flow requirements of this engine and sustain high pressure recovery at all flight conditions. The inlet 14 provides the first stage of static pressure rise (compression) of the air entering housing 26.

Externally mounted fan drive gas generator 12 comprises what is commonly referred to as a turbojet engine, here utilized strictly for the production of elevated temperature and pressure gases to power the tip-turbine equipped fan assembly 18. Chamber 28 is designed to direct the gases from gas generator 12 into contact with the tip-turbine portion of the fan 30 of the fan assembly 18. Once the hot high-pressure gases have passed through the tip-turbine portion, energizing the remainder of the fan assembly 18 wherein fan 30 functions to effect compression of air from inlet 14, these gases are directed into housing 26 where they mix with the fan-compressed air. The powered fan 30 then provides the second stage of static pressure rise (compression) of the air entering housing 26.

The fan 30 is designed to remain exposed to the air stream passing through the engine over its entire operating range. At high flight speeds when the fan assembly is not powered by the gas generator 12, it is allowed to autorotate wherein the engine airflow passing from inlet 14 to housing 26 operates on fan 30 to produce said autorotation. The fan is accordingly designed with one, or at most a few, stages of rotor blading in order to achieve low total pressure losses and to not restrict engine air flow during said autorotation. It is considered that possible auxiliary power may be extracted from the fan during said autorotation.

Located adjacent to and downstream of the fan 30 and suspended within housing 26 is a plurality of ejector nozzles 32. These nozzles are to be formed in a basic convergent-divergent manner so as to effect a supersonic gaseous exhaust. Hydrogen peroxide at a nominal strength of 90 percent is pumped to high pressure and decomposed into superheated steam and oxygen (means for this are not shown) and passed through nozzles 32 to effect an ejector or jet-pump action with the air passing through the fan 30 and into the mixer 20. A large number of nozzles, or equivalent thereof such as one or more concentric annular nozzles, will be employed so as to uniformly distribute the supersonic ejector nozzle flow into the air stream at the entrance of the mixer 20 in order to minimize the length of duct required to completely mix the ejector flow, and to maximize the total pressure at the end of the mixer. The high velocity (kinetic energy) decomposed hydrogen peroxide exiting from the ejector nozzles 32 is converted to pressure energy in the mixer 20, and this process thus described is termed "jet compression." The ejector nozzles 32 and the effective mixing with the air flow in mixer section 20 thus provide the third stage of compression or static pressure rise of the air entering housing 26.

For efficient mixing of gases flowing from the ejector nozzles 32 and the air flow entering the mixer 20, it is desired that the air velocity in the mixer 20 be as high as possible. However, this velocity is too high for efficient combustion in the combustion chamber 22. Therefore, in FIG. 1, a diffuser section 21 is employed to increase the flow area through housing 26 to affect a reduction in flow velocity and further increase the static pressure of the mixture in combustion chamber 22. Hence, the combined means to supply the ejector flow, the mixing with air and the diffusion of the mixed gases is referred to as the jet compressor section of engine 10. The final or downstream portion of the jet compressor section functions to reduce the mixed flow velocity and thereby raise the static pressure prior to injection of fuel through conduit 34 into ramjet combustor 22.

The described combined gaseous flow passing from the diffuser 21 contains injected fuel, which can be conventional hydrocarbon aircraft fuel designated as JP-fuel, and is burned within the combustion chamber 22 to produce a high-temperature combustion gas stream.

The exit nozzle 24 accelerates the resulting combusted gas stream through a throat area and then expands such to ambient pressure thereby providing a supersonic gas flow. Generally, a variable geometry exhaust nozzle is utilized in this engine to provide near-optimum throat and exit flow areas for the wide range of flight and operating conditions of which the engine of this invention is capable. Any appropriate exit nozzle design may be employed with this engine.

Referring to FIG. 2 of the drawings there is shown a second embodiment 36 of the engine of this invention having an air induction system diffuser outlet 38, a fan assembly 40, a mixer 42, a combustion chamber 44 and an exhaust nozzle 46. Basically the embodiment of FIG. 2 is configured similar to and is to be operated in the same way as the embodiment of FIG. 1. Inlet air is compressed by fan 48 of the fan assembly 40 combining a part of the resulting compressed air with the gaseous products of hydrogen peroxide being supplied to the mixer 42 through a plurality of ejector nozzles 50. The resulting mixed stream is combusted with hydrocarbon fuel in the combustor 44 and the resulting combusted stream is accelerated to ambient through the nozzle assembly 46.

However, one distinction of the embodiment of FIG. 2 over that of FIG. 1 is that the fan drive gas generator 12, shown externally mounted in FIG. 1, is internally mounted in the embodiment of the engine of this invention in FIG. 2. The gas generator 54 in FIG. 2 includes an air inlet 56 downstream of fan 48, a compressor section 58, a combustion chamber 60, and two output turbines. Turbine wheel 62 drives compressor 58, while turbine wheel 64 drives fan 48, together comprising assembly 40. The fuel from conduit 66 is supplied to combustion chamber 60. The gases produced within the gas generator 54 are passed through nozzle 68 and mixed with the output flow of the nozzle 46. The resulting mixed gaseous stream is passed exteriorly of the engine 36 into the ambient.

The primary advantage of the second embodiment 36 of the engine over the first embodiment 10 is that the fan driven gas generator is physically combined within the engine housing 52 instead of being externally located as shown in FIG. 1. As a consequence, the resulting combination generally facilitates installation within the aircraft, dependent upon the airframe configuration. It is to be emphasized, however, that the embodiment 10 of FIG. 1 as well as the embodiment 36 of FIG. 2 can both be satisfactorily installed in a modern aircraft and therefore represent complementary variants of the engine of this invention.

Referring now to FIGS. 3 through 8 of the drawings, block diagrams are shown to illustrate the functional makeup of the engine of this invention and the different operating modes of which it is capable. As described previously, it is this multimode feature which provides the engine's extremely wide operating range capability. The block diagrams are to be applicable to either the embodiment of FIG. 1 or the embodiment of FIG. 2.

The block diagram of FIG. 3 represents the entire engine arrangement for this invention showing the various associated subsystems and the means of control. The interface between the overall propulsion system and the aircraft is also represented, with the means of providing JP fuel and hydrogen peroxide to the engine as well as pilot or crew control inputs being shown. In turn, the engine of this invention provides thrust (not shown) and electrical, hydraulic and other shaft power which supply auxiliary outputs to the aircraft in which it is installed. The engine, as reflected in FIG. 3 comprises the following major items: Fan (Block No. 1), Gas generator (Block No. 2), Ejector (Block No. 3), Mixer and diffuser (Block No. 4), Combustor (Block No. 5), Nozzle (Block No. 6), Engine control (Block No. 7) and Power unit (Block No. 8). Also shown to complete the propulsion system, but not an intrinsic part of the engine of this invention is an Inlet (Block No. 0).

Also shown in FIG. 3 is the makeup of the three major subsystems of the engine; the Fan subsystem consists of the fan and gas generator; the Jet Compressor subsystem consists of the ejector, mixer and diffuser, and the Ramjet subsystem consists of the combustor and nozzle. The engine control communicates with the gas generator, ejector, combustor and nozzle of the engine, and also the inlet.

The block diagrams of FIGS. 4–8 are based on that of FIG. 3, but show the functional relationships between the elements of the engine represented by the aforementioned numbered blocks, between the engine and the inlet and between the engine and the aircraft within which it is installed. The block diagrams correspond to the five operating modes of which the engine of this invention is capable of matching itself to various flight conditions and a range of thrust demands.

FIG. 4 depicts the Supercharged Ejector mode which provides high thrust operation from zero speed to an intermediate supersonic flight condition, as required for such needs as short-field takeoff, high rates of climb, combat maneuvering and to accelerate rapidly to maximum cruising speed. In this mode, as depicted in FIG. 4, all three major subsystems of the engine, the fan, the jet compressor and the ramjet are operated with the engine consuming both JP-fuel and hydrogen peroxide. In this mode, throttling is effected by controlling hydrogen peroxide flow. The fan remains at maximum power level and the ramjet at maximum fuel/air ratio, which may be as high as the stoichiometric ratio depending on flight conditions and the means for cooling the ramjet subsystem.

FIG. 5 depicts the Fan Ramjet mode which provides intermediate thrust levels from zero speed to an intermediate supersonic flight condition, in general for the same purposes delineated for the Supercharged Ejector mode. Although this mode provides less thrust, it offers a considerably lower rate of propellant consumption. In this mode the fan and ramjet subsystems are activated. In the Fan Ramjet mode, throttling is effected by controlling the flow of JP-fuel to the ramjet combustor, with the fan remaining essentially at full power.

FIG. 6 depicts the Ramjet mode which provides the means of operating the engine from a low or intermediate supersonic flight condition to the multiple-Mach number maximum speed for which it is rated. In this mode only the ramjet subsystem is operated with the fan autorotating. Throttling is effected by controlling the flow of JP-fuel to the combustor from quite lean to near stoichiometric dependent on flight conditions and the means of cooling the ramjet subsystem employed.

FIG. 7 depicts the Ejector mode which is a superperformance feature of the engine used at high flight speeds to achieve sudden bursts of thrust for executing rapid acceleration and/or climb or for extreme combat maneuvers. As for the Supercharged Ejector mode both JP-fuel and hydrogen peroxide is consumed with throttling being accomplished by controlling hydrogen peroxide flow into the ejector. In addition, very low flow rates of hydrogen peroxide can be initiated to significantly extend the operating range of the Ramjet mode described in FIG. 6 by virtue of creating a more favorable combustion environment in the ramjet subsystem.

FIG. 8 depicts the Fan mode which provides maximum operating economy (low JP-fuel consumption) for subsonic cruise and loiter requirements. In this mode only the fan subsystem is operated and throttling is accomplished by adjusting the fuel flow to the gas generator.

It should be noted that the engine's exit nozzle is controlled such that each of the five operating modes described above is performed at maximum overall effectiveness and efficiency. Similarly the inlet is so controlled.

In addition to providing the multimode operating feature of the engine of this invention, the several operating modes illustrated in FIGS. 4–8, and described above, will also serve to enhance engine reliability and survivability, in the instance of combat aircraft usage. The engine is relatively simple in its makeup being a modular assembly of essentially non-interdependent subsystems. Whether due to wear-out failure, environment induced degradation, or direct enemy action, the partial or complete loss of a major subsystem may not necessarily result in the complete loss of engine function. For example, if the ejector assembly is disabled, the engine can still operate effectively over its normal range in the Fan, Fan Ramjet, and Ramjet modes.

Another advantage of this engine, when operating in the Supercharged Ejector mode or Ejector mode, is that it is not significantly susceptible to hot-day condition thrust loss or thrust loss due to partial jet exhaust ingestion, which frequently poses a problem in vertical takeoff and landing (VTOL) applications. This insensitivity to an otherwise unfavorable environment for air-breathing engines is a reflection of the engine's rocket-like nature when it is operated with the jet compressor functioning.

What is claimed as new in support of Letters Patent is:

1. An engine comprising:
    an engine housing including in downstream order an air inlet, a fan, a mixer section, a diffuser section, a combustion chamber and a nozzle assembly;
    said fan located within said housing and adjacent to said inlet and downstream thereof, said fan to effect compression of the air prior to being passed through said housing;
    a jet compressor including said mixer section and said diffuser section, said mixer section located immediately downstream of said fan but spaced upstream of said combustion chamber, a readily decomposed fluid ejectable into said mixer section of said jet compressor which produces a decomposed gaseous composition which is then conducted within said diffuser section, said jet compressor to cause further compression of the air within said housing throughout both said mixer section and said diffuser section while effectively mixing said decomposed gaseous composition with air;
    a ramjet located within said housing and adjacent to said jet compressor, said ramjet including said combustion chamber and said nozzle assembly, said combustion chamber to effect combustion of fuel and said decomposed gaseous composition with air, said nozzle assembly permitting acceleration and discharge of the gaseous mass from said combustion chamber.

2. Apparatus as defined in claim 1 wherein:
    said fan being driven by a gas generator, said gas generator producing power by means of expansion of gases, a portion of said power being employed to drive said fan, the remaining unused portion of said power being additively supplied to the engine thrust.

3. Apparatus as defined in claim 2 wherein:
    said fan including a turbine at the periphery of said fan, the expanded gases of said gas generator passing through said fan tip thereby driving said fan, said gas generator located external to said housing.

4. Apparatus as defined in claim 2 wherein:

said gas generator being located within said housing, said fan connected to a power turbine, said power turbine located within said gas generator.

5. Apparatus as defined in claim 1 wherein:
said fluid of said jet compressor comprising hydrogen peroxide, said gaseous composition comprises a mixture of superheated steam and oxygen.

6. Apparatus as defined in claim 1 wherein:
said mixer section having a constant flow area wherein mixing of said air and said gaseous composition is efficiently performed thereby raising the pressure across said mixer section.

7. Apparatus as defined in claim 2 wherein:
said fan autorotates upon said gas generator being inoperative.

8. Apparatus as defined in claim 7 wherein:
power extraction means to extract power from said fan during autorotation.

9. Apparatus as defined in claim 6 wherein:
said diffuser section located downstream of and adjacent to said mixer section, said diffuser section having increasing flow area wherein diffusion of said mixture is efficiently performed to reduce flow velocity and raise the static pressure to permit efficient combustion with low pressure losses.

* * * * *